United States Patent [19]
Neil

[11] 3,992,800
[45] Nov. 23, 1976

[54] ACTION LURE

[75] Inventor: Ernest M. Neil, Clinton, Miss.

[73] Assignee: Action Lure Company, Jackson, Miss.

[22] Filed: Mar. 23, 1976

[21] Appl. No.: 669,473

[52] U.S. Cl. ............................ 43/42.24; 43/42.31
[51] Int. Cl.² .................................... A01K 85/00
[58] Field of Search ..................... 43/42.24, 42.31

[56] References Cited
UNITED STATES PATENTS

| | | | |
|---|---|---|---|
| 2,971,285 | 2/1961 | Murawski | 43/42.24 X |
| 3,158,952 | 12/1964 | Creme | 43/42.24 |
| 3,490,165 | 1/1970 | Thomassin | 43/42.24 X |
| D233,988 | 12/1974 | Best | 43/42.24 X |

Primary Examiner—Louis G. Mancene
Assistant Examiner—Daniel J. Leach
Attorney, Agent, or Firm—Cushman, Darby & Cushman

[57] ABSTRACT

A fish lure that presents a life-like appearance comprising a head, tail, flexible core connecting the head and the tail, rib members extending radially from the core, concentric therewith, and spaced from each other along the length of the core, and a plurality of shell members extending between adjacent rib members to form air pockets. When the lure is used with a sinker, as the lure descends in the water, air is trapped by the pockets — slowing the descent — and when it is released it creates bubbles which emit sound, and changes the rate of descent of the lure, thereby giving it a life-like appearance. When pulled along the water's surface, the lure generates air bubbles again emitting a sound, and providing a life-like appearance to the lure.

10 Claims, 6 Drawing Figures

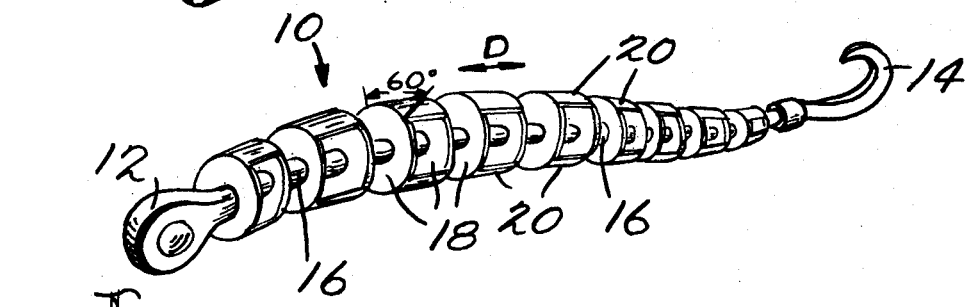
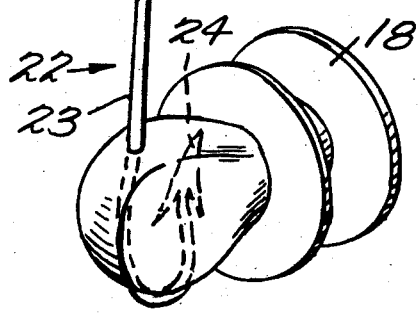
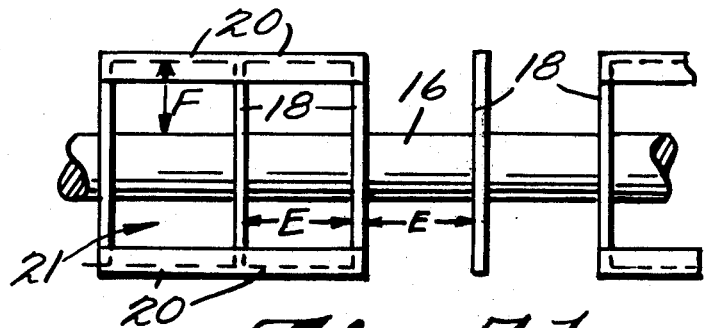
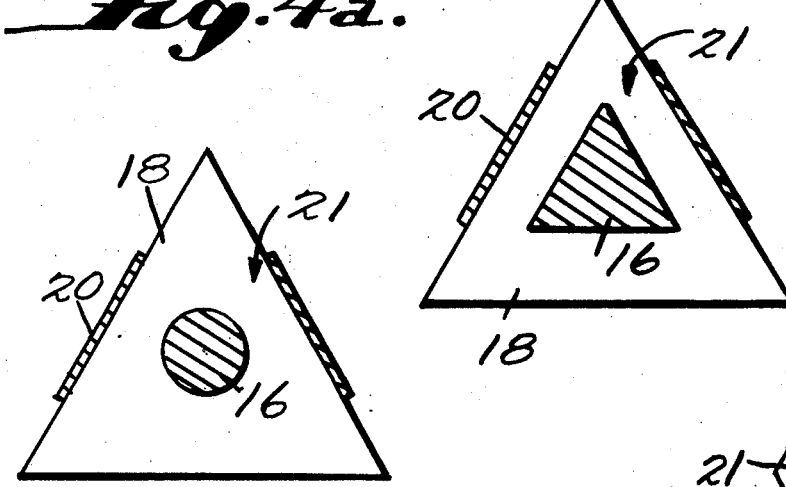
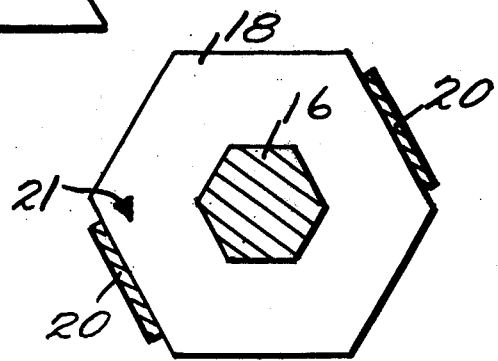

ACTION LURE

BACKGROUND AND SUMMARY OF THE INVENTION

In the production of fishing lures, it is desirable to make a lure that is life-like as possible so that it will provide maximum attraction to fish. In the past there have been many proposals for making lures life-like by providing various sound and bubble emitting devices associated therewith. Typical prior art lures are shown in U.S. Pat. Nos. 2,561,040, 2,665,513, 2,971,285 and 3,412,500. While such lures are generally successful, they do not allow a multitude of uses while still providing a life-like appearance, nor ae they utilizable with sinkers to provide a life-like appearance as they descend into water into which they are cast. For instance, in U.S. Pat. No. 2,971,285 by pulling upon a line, one can effect a diving action of the lure to cause water to rush through tubes thereof and generate a life-like appearance, however, it is believed that air bubbles are not generated thereby that emit sound and also effect a life-like appearance of the lure. In U.S. Pat. No. 3,412,500 bubbles are generated as the lure is pulled along the surface of the water, and while such bubbles emit sounds that are attractive to fish, they do not otherwise cause a life-like appearance of the lure, or allow the use thereof with a sinker.

According to the present invention, a lure is provided that presents a life-like appearance both when used with a sinker, or pulled along the water's surface. According to the present invention, a lure comprises a head, a tail, a flexible core connecting the head and the tail, a plurality of radially extending rib members concentric with the core and spaced along the length thereof, and a plurality of shell members extending between adjacent rib members and radially spaced from the core, the shell members in combination with the core and the rib members which it bridges defining air pockets. When the lure is cast into the water with a sinker or the like, the air pockets trap air and slow the descent of the lure into the water. As the lure does descend and the lure is pulled, the air is released as bubbles, emitting a sound which is attractive to fish, and also changes the rate of descent of the lure, both of which provide a life-like appearance to the lure, and attract fish. When the lure is used without a sinker and pulled along the water's surface, the air pockets trap air and generate bubbles, which again effects a life-like appearance thereof.

It is the primary object of the present invention to provide an improved, multi-use lure which will present a life-like appearance to fish. This and other objects of the invention will become clear from an inspection of the detailed description of the invention, and from the appended claims.

BRIEF DESCRIPTION OF THE DRAWINGS

FIG. 1 is a perspective view of an exemplary fish lure according to the present invention;

FIG. 2 is a detailed perspective view of the head area of the lure of FIG. 1 showing a hook, line and sinker in operative association therewith;

FIG. 3 is a side view of a portion of a fish lure body showing a modified form of shell members from the embodiment shown in FIG. 1; and FIGS. 4a–4c are cross-sectional views of a number of other various modifications of the core and rib members of a lure according to the present invention.

DETAILED DESCRIPTION OF THE INVENTION

An exemplary fish lure according to the present invention is shown generally at 10 in FIG. 1. The lure 10 generally comprises a head 12, a tail 14, and a core 16 connecting the head to the tail. The core is made of flexible material, such as a soft plastic and extends generally in a dimension D. A plurality of rib members 18 extend radially from the core 16 and are generally concentric with the core 16 in order to provide a generally symmetrical body. The rib members 18 are spaced a distance E from each other along the dimension of elongation D of the core 16. The cross-sectional area of the core 16 and the area of the rib members 18, decreases from the head 12 to the tail 14. The fish lure 10 generally may be colored or sized as desired, and formed of a variety of materials, so as to be most attractive to the type of fish one desires to catch therewith.

According to the present invention, a plurality of air pockets are provided associated with the lure 10 to control the descent thereof when it is cast into water during fishing and to provide for sound emission to further attract fish thereto. The air pockets are defined by a plurality of shell members 20 extending between adjacent rib members and radially spaced a distance F therefrom. The shell members 20 of course do not extend around the whole periphery of the rib members 18, but may extend any desired distance therearound as long as the desired function according to the present invention is carried out. The area defined by the inner portion of a shell member 20, the circumference of the core 16 and the adjacent ribs 18 which the shell member 20 bridges defines an air pocket 21, which is capable of trapping air therein when the lure is cast into water, so that the air moves downwardly with the lure as it descends in the water.

The air that is trapped in the air pocket 21 is released at some point during the descent of the lure 10 into the water, and when the air is released in the form of a bubble, sound is emitted which provides an attraction for fish. The air in the pockets 21 initially slows the descent of the lure 10 from what it would be if no air pockets were provided, and as air is released from the pockets 21, it changes the rate of descent of the lure 10, and this changing rate of descent makes the lure appear to be a living creature so that fish are attracted to it.

The shell members 20, the rib members 18 and the core 16 may be formed in a variety of configurations and still accomplish the objectives according to the present invention. In the preferred embodiment of the invention shown in FIGS. 1–3, the core 16 is circular in cross-section, while the ribs 18 are generally circular discs. In the FIGS. 1–3 embodiments the shell members 20 preferably are arcuate, extending around the periphery of the rib members 18 a predetermined arc. Although there are a wide variety of arcs that provide a workable structure, as shown in the drawings the arc for each member 20 is about 60°. Such an arc is preferred since it allows the head 12, tail 14, core 16, rib members 18 and shell members 20 to be injection moulded from plastic as an integral formation. If the arc over which each of the shell members 20 extend is too large, it is not possible to injection mould the lure. Instead of being circular discs, the rib members 18 may be triangular in shape, as shown in FIGS. 4a and 4b, or hexagonal, as shown in FIG. 4c, or any of a variety of other shapes. The core 16 may also be either triangular in cross-section (FIG. 4b), hexagonal (FIG. 4c) or a variety of other shapes.

The shell members 20 may extend between consecutive sets of rib members 18, as shown in FIG. 3 or may alternate every other rib member, as shown in FIG. 1, and more than one shell member 20 can be provided between adjacent rib members 20. In fact, it is preferable that two shell members 20 extend between each set of rib members 18 with which air pockets are to be formed, in order to provide balance for the lure — such a preferred arrangement is shown in FIGS. 1 and 3.

When the lure 10 is being used for fishing, although a fish hook may be attached to a number of different parts thereof, it is preferred — as shown in FIG. 2 — that hook 22 be attached to the head 12 of the lure 10. As shown in FIG. 2, the shaft portion 23 of the hook 22 may extend into the head 12, through it, back out of it, and back into it, so that the hook tip 24 is buried in the head 12. Preferably the lure 10 is used with a sinker, such as slip sinker 26 on line 25, to provide the downward movement of the lure 10 into water into which it is cast. However, if the lure 10 is to be used in grassy-water areas, or for certain types of fish, a sinker need not be employed. In such a case, the lure 10 may be dragged along the water's surface by reeling in the line 25, the lure preferably having a density about that or slightly less than the density of water. When the lure is dragged along the water's surface, bubbles are generated thereby (just as in the utilization of the device in prior art patent, U.S. Pat. No. 3,412,500) which bubbles also are attractive to fish.

An exemplary lure 10 according to the present invention having been described, a mode of utilization thereof will now be set forth. A lure 10 is formed by injection moulding plastic, air pockets 21 being provided therewith. In use, a hook 22 is inserted through the head 12 of the lure, and a slip sinker 26 is disposed on line 25. The hook, line, sinker and lure are then cast into the water, and the lure 10 starts to descend in the water — under the weight of the sinker 26 — trapping air in the pockets 21. The air in the pockets 21 slows the descent of the lure 10 compared to what it would be if no air pockets were provided, and as the lure 10 sinks, air bubbles are occasionally released from the pockets 21 as the lure 10 is jerked in the water by line 25. The release of the air bubbles changes the rate of descent of the lure 10, and emits sound, both of which make a fish think the lure is a living creature, and attract the fish to it. When it is desired to use the lure in grassy water areas, the sinker 26 is removed, the lure 10 cast onto the surface of the water, and the line 25 reeled in, the lure generating bubbles — and thus attracting fish — as it is reeled in.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A fish lure comprising
   a head,
   a tail,
   a flexible core connecting said head to said tail, and having a dimension of elongation thereof, a plurality of rib members extending generally radially from said core, said rib members being spaced along the dimension of elongation of said core,
   means defining a plurality of air pockets for trapping air, said means comprising a plurality of shell members extending between adjacent rib members and attached thereto and radially spaced from said core.

2. A fish lure as recited in claim 1 wherein two shell members extend between adjacent rib members.

3. A fish lure as recited in claim 1 wherein said core has an increasingly smaller cross-sectional area from said head to said tail.

4. A fish lure as recited in claim 1 wherein shell members extend between a plurality of consecutive rib members.

5. A fish lure as recited in claim 1 wherein shell members extend between alternate rib members.

6. A fish lure as recited in claim 1 wherein said core is substantially circular in cross-section, and said rib members are substantially circular discs extending generally concentric with said core, and wherein each shell member is arcuate and extends over an arc of about 60° around said rib members.

7. A fish lure as recited in claim 6 wherein said core, head, tail, rib members and shell members are all an integral formation of injection moulded plastic.

8. A fish lure as recited in claim 1 in combination with a hook, line and sinker.

9. A fish lure as recited in claim 8 wherein said sinker is a slip sinker.

10. A fish lure as recited in claim 8 wherein said hook is disposed through the head of said fish lure.

* * * * *